(12) United States Patent
Koshak et al.

(10) Patent No.: US 6,494,298 B1
(45) Date of Patent: Dec. 17, 2002

(54) HIGH EFFICIENCY SHOES FOR A JACK ARRESTER

(75) Inventors: John W. Koshak, Barrington Hills, IL (US); Paul L. Baldwin, Salem, WI (US)

(73) Assignee: Inventio AG, Hergiswil NW (CH)

( * ) Notice: Subject to any disclaimer, the term of this patent is extended or adjusted under 35 U.S.C. 154(b) by 0 days.

(21) Appl. No.: 09/571,589

(22) Filed: May 17, 2000

(51) Int. Cl.$^7$ .............................................. B65H 59/10
(52) U.S. Cl. ..................... 188/67; 188/259; 188/251 M
(58) Field of Search .......................... 188/67, 189, 372, 188/376, 272, 251 M, 249, 259; 187/351; 294/102.2

(56) References Cited

U.S. PATENT DOCUMENTS

| | | |
|---|---|---|
| 1,356,458 A | 10/1920 | Moody |
| 1,469,894 A * | 10/1923 | Clarke .......................... 188/67 |
| 3,571,865 A | 3/1971 | Johnson |
| 3,647,027 A | 3/1972 | Jaseph |
| 3,742,562 A * | 7/1973 | Haby ............................ 188/67 |
| 3,762,512 A | 10/1973 | McIntyre |
| 3,783,976 A | 1/1974 | Kerr |
| 3,783,983 A | 1/1974 | McNally et al. |
| 3,995,534 A | 12/1976 | Rastetter |
| 4,007,815 A | 2/1977 | Acre |
| 4,275,488 A * | 6/1981 | Gray et al. .................... 188/67 |
| 4,306,339 A | 12/1981 | Ward |
| 4,449,615 A | 5/1984 | Beath et al. |
| 4,550,942 A * | 11/1985 | Berg ........................ 294/102.2 |
| 4,715,456 A | 12/1987 | Poe, Jr. et al. |
| 4,781,102 A | 11/1988 | Scerbo et al. |
| 4,823,919 A | 4/1989 | Hayatdavoudi |
| 5,490,443 A | 2/1996 | Atsuta |
| 5,553,690 A | 9/1996 | Takahashi |
| 5,810,119 A | 9/1998 | Koshak |
| 5,964,320 A | 10/1999 | Kato et al. |
| 5,964,322 A | 10/1999 | Thompson et al. |
| 6,039,151 A | 3/2000 | Ringel et al. |
| 6,206,145 B1 * | 3/2001 | Cable et al. ................... 188/67 |

\* cited by examiner

Primary Examiner—Matthew C. Graham
Assistant Examiner—Mariano Sy
(74) Attorney, Agent, or Firm—MacMillan, Sobanski & Todd, LLC

(57) ABSTRACT

A brake apparatus engages and locks a piston of a hydraulic elevator drive carrying an elevator car or a cable pulley. The brake apparatus includes a pair of opposed pivotally mounted brake arms each having a curved support carrying a brake lining for engaging the exterior surface of the piston. Each brake lining is formed by bending a planar body at a plurality of the vertical grooves formed in a contact surface to define planar sections. The lining is attached to the support with the sections spaced from the curved support surface. As the brake linings are brought into engagement with the piston surface, the compression forces are evenly distributed by the planar sections functioning as springs.

11 Claims, 4 Drawing Sheets

HIGH EFFICIENCY SHOES FOR A JACK ARRESTER

BACKGROUND OF THE INVENTION

The present invention relates to brake shoes or liners utilized in an arresting or braking device to control the contact stress imparted into the axially moving ram or plunger to arrest its motion. The arrestor device is provided for the stopping or braking of a ram, plunger or elevator jack in case of undesired downward motion. The arrestor has a pair of arms tiltable by means of a hydro-mechanical system, and the shoes or liners affix to the arms such that they are not touching the ram or cylinder in the open position and engage circumferentially when the arms are in the closed or set position.

In the U.S. Pat. No. 5,810,119, there is shown an arresting device for a hydraulic elevator in which the advantages of the shoes or liners are listed therein. In the present invention, the shoes or liners reflect an improvement of the stopping or arresting ability of the arresting device with a reduced stress inserted into the ram, plunger or jack. This is advantageous as the reduced stress assures that yielding stresses are not imparted into the ram, plunger or jack. Further, the unique characteristics of the present embodiment shoe or liner design, by the grooves and segmentation described herein, provide effective stopping over a wide range of material tensile strengths. It is possible that rams, plungers or jacks can be of varying tensile strengths measured by Rockwell or Brinell methods, converted from hardness to tensile strength and be applied in an elevator application without detriment to the elevator operation or safety. Because of these varying tensile strengths, it was necessary to improve the prior art to accommodate the tensile strength differences and the present embodiment of shoes or liners have shown 100 percent effectiveness over the tensile strength ranges of known rams, plungers or jacks.

SUMMARY OF THE INVENTION

The present invention relates to improvements to the shoe or liner by machining and curving or bending the shoes or liners that mount on the arms of an arresting device. The arms pivot about a ram, plunger or jack and when in the open position, allow bi-directional axial motion. In the event of an uncontrolled or undesirable motion in one direction, the arms rotate in unison toward the ram, plunger or jack such that the shoes or liners come into circumferential mechanical contact with the ram causing an arrest of the undesirable axial motion without permanent yielding of the ram, plunger or jack. This device is described in the U.S. Pat. No. 5,810,119.

The preferred embodiment and present invention concerns the machining and shape of the shoes or liners. In practical application it was found that rams, plungers or jacks have various tensile strengths and that allowed the possibility of permanent yielding of the ram, plunger or jack when the arresting stress was applied into rams, plungers or jacks of lower tensile strength steel. After determining the cause of unexpected yielding, the preferred embodiment shoe or liner was designed, tested and found to satisfactorily arrest the low tensile strength rams, plungers or jacks without the permanent yielding seen with the shoe or liner design of the prior art. It has also been successfully tested for effectiveness at higher tensile strengths.

The embodiment of the vertical grooves machined into the shoe or liner material and subsequent segmentation caused by curving the shoe or liner after the machining creates a geometry where the arresting stress is inserted into the ram, plunger or jack at generally uniform, specific locations. This is an improvement over the prior art as the prior art shoes or liners inserted stresses that were more random, given their reliance on circularity of all of the components and consistent wall thickness.

Further, this is an improvement over the prior art as the prior art shoes or liners inserted arresting stress into a population of rams, plungers or jacks that had varying wall thicknesses that caused inconsistent arresting results. Present improvements allow for a uniform compensation for varying wall thicknesses of the ram, plunger or jack by utilizing a spring effect of the shoe or insert material that is formed by a chord formed when the shoe or liner is mounted into its round mounting support and the segment ends under the vertical machining contact the mounting support. This segmentation allows for higher arresting stresses to be compensated for by the spring bending rather than unequally forced back into the ram, plunger or jack. Segmentation around the full circumference therefore allows an equal distribution of stresses allowing ram, plunger or jack yielding stresses to be taken up by the spring effect of the shoe or liner segments.

The improvements also cause a uniform compressive stress load into the ram, plunger or jack wall that adds structural stiffness to the ram plunger or jack material when the arresting stress is applied by the segmented shoes or liners. This arresting stress is also lower with the improved embodiment, that is to say the arresting stress applied with the same loads and ram, plunger or jack is higher with the prior art shoes or liners. This reduces the overall arresting stress that possibly leads to yielding the ram plunger or jack yet retains the satisfactory arrest. This lower arresting stress is a function of the uniform insertion of the stress into the ram, plunger or jack in combination with the spring effect of the segmentation.

Another improvement of the present design overcomes another property of some rams, plungers or jacks, that of a very low coefficient of friction due to the surfacing of the ram, plunger, or jack. By adding friction material such as grit or silica into the improved shoe or liner in a mechanical cavity, a controlled amount of frictional material compensates for the low friction of the ram, plunger or jack and assures proper seating of the arms into their fully arresting position.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
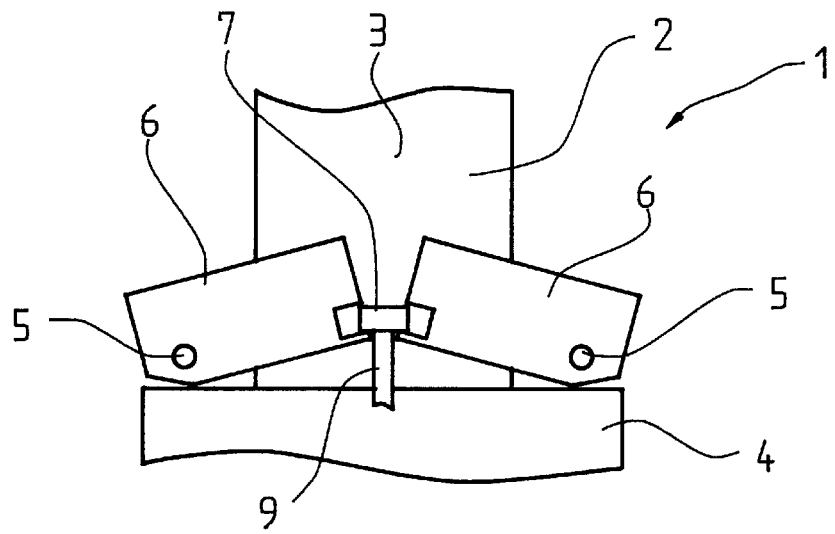
FIG. 1 is a schematic front view of a mechanical brake or arresting apparatus in accordance with the present invention acting on a ram, plunger or jack.

A brake apparatus 1 is shown in the FIG. 1 arranged around a generally cylindrical piston 2 of a hydraulic driving machine, commonly known as a ram, plunger or jack, which apparatus selectively locks the piston that carries an elevator car (not shown) or a cable pulley (not shown). The piston 2 is typically formed of a steel material and has an exterior surface 3 that is ground to a smooth finish, typically fifteen to twenty-four microns. Attached at an upper end of a hydraulic cylinder (not illustrated) guiding the piston 2, is a baseplate 4 upon which are pivotally mounted at least two brake arms 6 each tiltable around an axis or pivot point 5. The brake arms 6 are actuated by means of a hydromechanical system connected to the arms by a coupling 7. The hydro-mechanical system includes a brake cylinder 8 (shown in FIG. 2a) having a slidable plunger 9 and an electromagnet (not shown) for extending and retracting the plunger. The upper end of the plunger 9 is attached to the coupling 7.

Figure 2A:
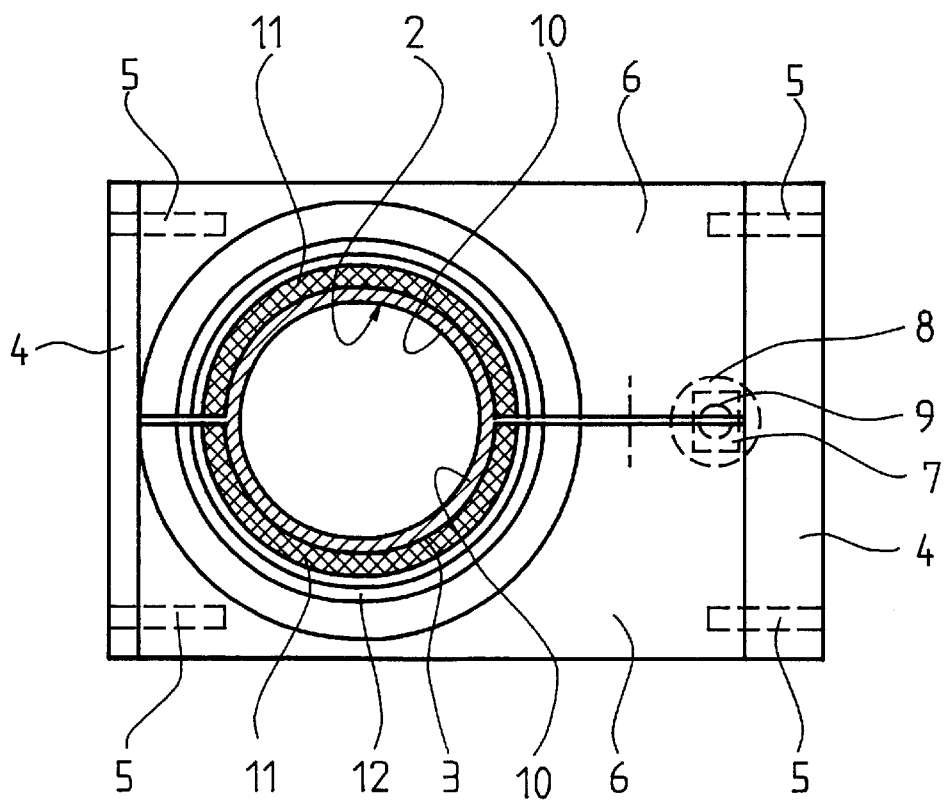
FIG. 2a is a top plan view of the brake or arresting apparatus shown in FIG. 1.

As shown in the FIG. 1, the brake arms 6 are pivoted upwardly around the respective axes 5 to a disengaged position. Arranged on each brake arm 6, as shown in FIG. 2a for example, is a semicircular brake lining 11 attached to the brake arm by a mounting support 12. Each brake lining 11 has a contact surface 10 facing the exterior surface 3 of the piston 2. In the case where braking is required, the plunger 9 is rotated downwardly to rotate the brake arms 6 downwardly and toward the piston 2 whereby the brake linings 11 surround the piston 2 and the contact surfaces 10 frictionally engage the exterior surface 3 and stop the piston from moving in the engaged position shown in the FIGS. 2a and 2b. The brake lining 11 is formed of a suitable material having a hardness less than the material from which the piston 2 is formed so as to minimize damage to the exterior surface 3 of the piston during braking. For example, the brake lining 11 can formed from a sheet of one quarter inch thick hard CDA 110 copper material. A typical brake lining 11 for a brake apparatus having two of the brake arms 6 has a body that is approximately two inches high with a width slightly less than one half the circumference of the piston 2. The body of the brake lining 11 is shaped as described below to correspond approximately to the contour of the exterior surface 3 of the piston 2.

Figure 2B:
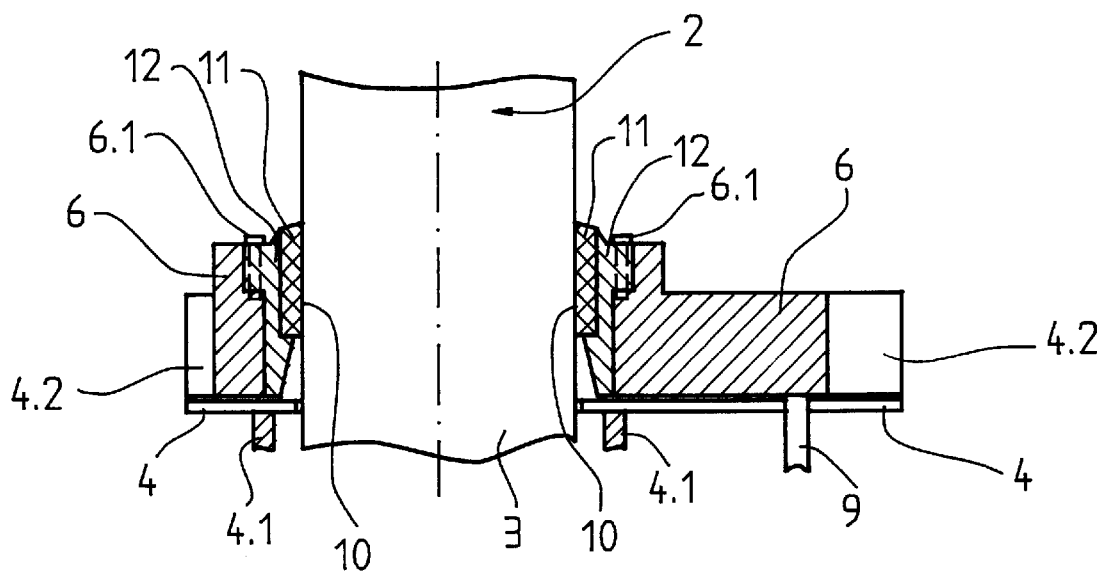
FIG. 2b is a cross section elevation view of the brake or arresting apparatus shown in FIG. 1.

In the FIG. 2b, the mounting support 12 is shown as being connected with the brake arm 6 by means of screws 6.1. The baseplate 4 carrying the brake arms 6 is supported by means of stays 4.1 on the upper end of the hydraulic cylinder (not shown). The brake arms 6 are rotatably mounted on associated sidewalls 4.2 attached to the baseplate 4.

Figure 3:
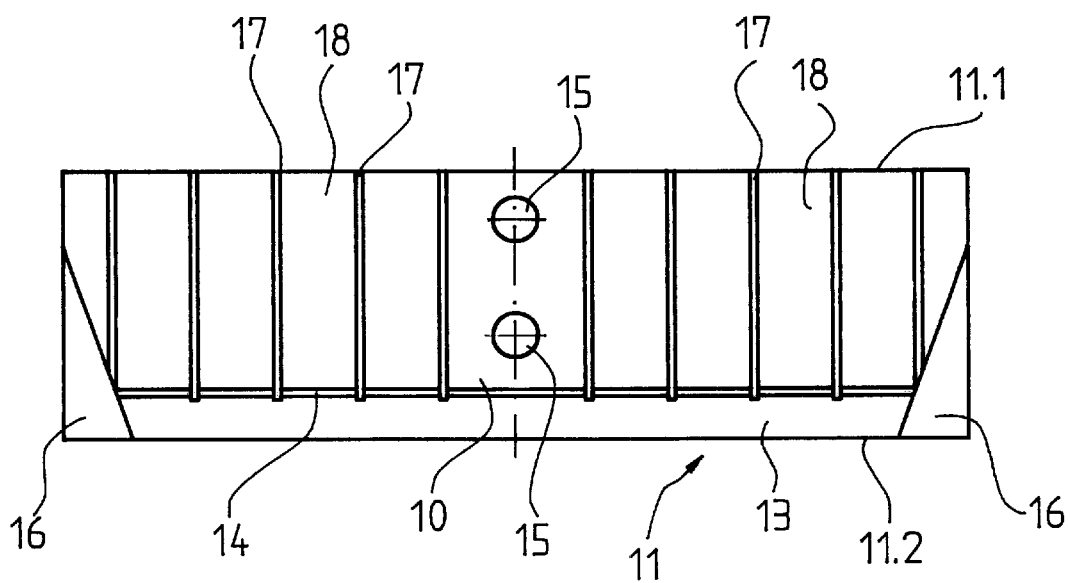
FIG. 3 is an elevation view showing the contact surface of the shoe or liner according to the present invention before being curved.
Figure 4:
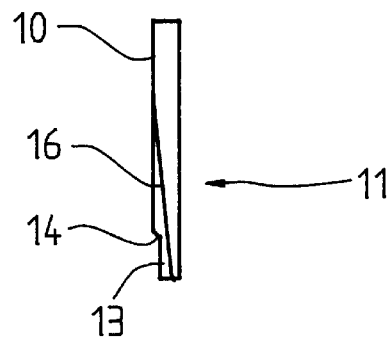
FIG. 4 is a side view of the right end of the shoe or liner shown in FIG. 3 before being curved.
Figure 5:
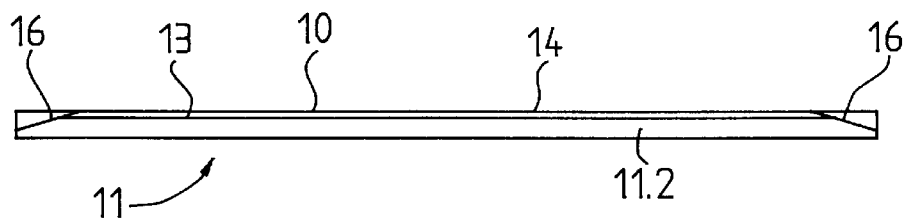
FIG. 5 is a bottom view of the shoe or liner shown in FIG. 3 before being curved.

Shown in the FIGS. 3 through 5 is a first embodiment of the brake lining 11 before being curved to cooperate with the mounting support 12 and the piston exterior surface 3. The lining 11 has a generally rectangular, planar shape with the inwardly facing contact surface 10 extending across the width thereof. The contact surface 10 also extends from an upper edge 11.1 of the lining 11 to a recessed portion 13 extending the width of the lining and downwardly to a lower edge 11.2. The lower edge of the contact surface 10 and the upper edge of the recessed portion 13 are joined by an angled portion or chamfer 14 extending generally horizontally at approximately forty-five degrees to the plane of the contact surface 10, but other angles could be used. The juncture of the lower edge of the contact surface 10 and the upper edge of the angled portion 14 can be approximately 0.38 inches from the lower edge 11.2. The edges 11.1 and 11.2 and the angled portion 14 extend generally parallel to one another.

The recessed portion 13 will not contact the exterior surface 3 of the piston 2 when the brake is operated. Upon pivoting of the brake arm 6 toward the position shown in the FIG. 2b, the brake lining 11 makes first contact at the center thereof with the angled portion 14 engaging the exterior surface 3. The vertical position of the angled portion 14 at the center of the brake lining 11 is chosen in such a manner that the first point of contact between the portion 14 and the surface 3 lies at about equal height, in the same horizontal plane, as the point of rotation about the axis of rotation 5 of the brake arm 6. This relationship eliminates any over-center condition thus preventing overrotation causing more interference than is intended when applied to the piston 2 and the pivot points 5 during pivoting into contact by the brake arms 6. Similarly, the force required to disengage the brake arms 6 from the piston 2 is reduced.

Provided at the center of the brake lining 11 is a pair of vertically aligned screw holes 15 to accept countersunk screws (not shown) that attach the brake lining to the mounting support 12. The screw holes 15 typically are formed as apertures sized to accept the shank of a suitable fastener at the time of manufacture and then the countersink portion is added after the lining 11 has been curved to the desired plunger diameter. Furthermore, the lower corners of the brake lining 11 can be ground off selectively as shown by generally triangular-shaped corner portions 16 to provide clearance when the brake lining is in the open position as in FIG. 1. For example, the portion 16 can be approximately one and one half inches high and 0.55 inches wide at the lower edge 11.2.

The brake lining 11 shown in the FIGS. 3–5 also has a plurality of spaced generally vertically extending grooves 17 formed or milled in the contact surface 10 extending from the upper edge 11.1 to the recessed portion 13. The grooves 17 can be milled into the lining 11 and may be approximately 0.09 inches wide by approximately one eighth inch deep.

Figure 6:
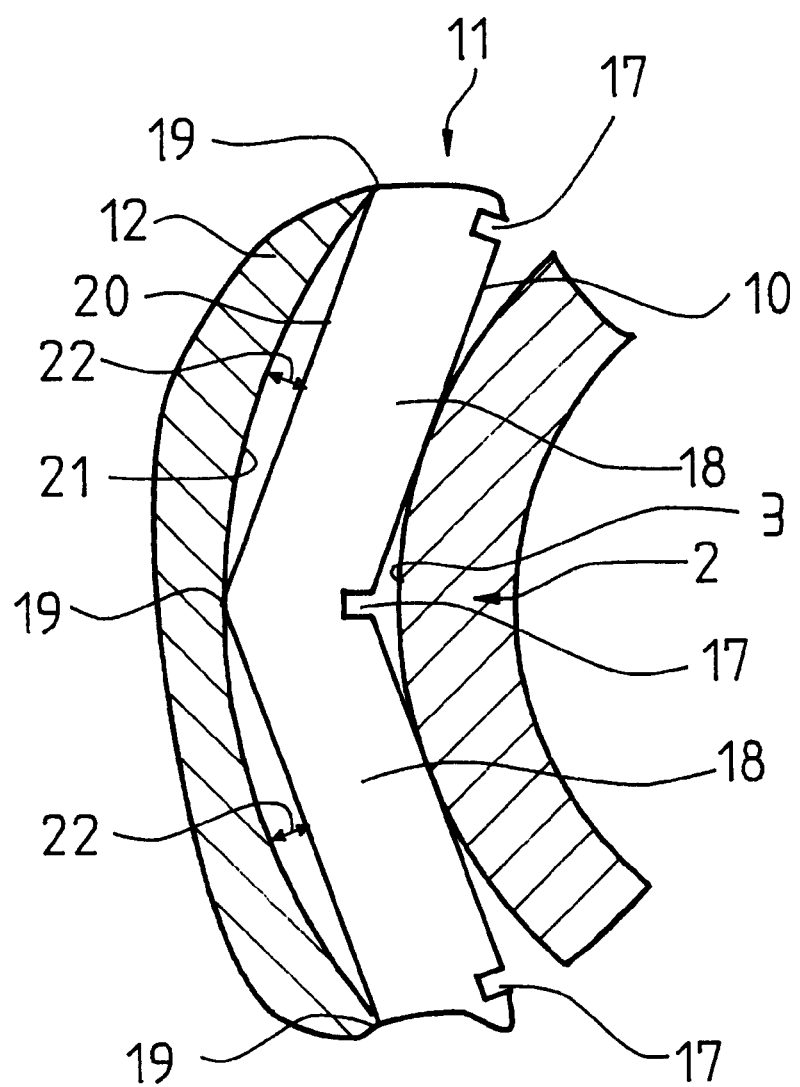
FIG. 6 is an enlarged fragmentary view with the contact surface of the shoe or liner after being curved facing to the right side of the figure.

There is shown in the FIG. 6 an enlarged portion of one of the brake linings 11 shown in the FIG. 2a. When the lining 11 is bent from the manufactured flat configuration shown in the FIG. 3 to conform to the curvature of the piston exterior surface 3 and to the curvature of the mounting support 12, it will tend to flex at the grooves 17. Thus, a plurality of sections 18 between adjacent ones of the grooves 17, or between one of the grooves 17 and an end edge of the lining 11, will tend to remain planar. These planar sections 18 become chords as a vertical bend line 19 is formed opposite each of the grooves 17 on an outer surface 20 of the lining 11. When the curved lining 11 is attached to the mounting support 12, the bend lines 19 contact an inner surface 21 of the support and the outer surface 20 is spaced from the support inner surface by a maximum spacing distance 22 occurring at approximately a center of the chord formed by each of the sections 18.

Being supported at the bend lines 19, the planar sections 18 function as "springs" under the compressive forces generated when the brake arms 6 close and the contact surface 10 contacts the piston exterior surface 3. Thus, the sections 18 deflect toward the surface 21 up to the distance 22 to compensate for irregularities in the surface 3 of the piston 2. An irregularity will tend to deflect the contacting chord section 18 rather than generate a higher arresting stress at that location on the wall of the piston 2. The spring constant of the chords 18 permits a much more uniform application of the compressive stress forces into the piston 2 than in the prior art brake linings having a continuously curved surface. Upon release of the brake, the sections 18 of the brake lining 11 do not retain the bent shape but are able to return to the straight positions shown in the FIG. 6.

Figure 8:
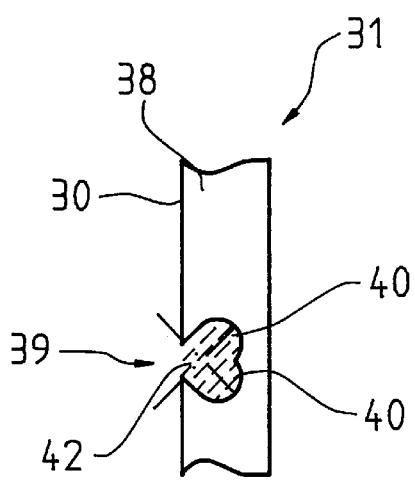
FIG. 8 is an enlarged fragmentary cross sectional view taken along the line 8—8 through one of the cavities of the alternate embodiment according to the present invention that is filled with a high friction material, mechanically bound.
Figure 7:
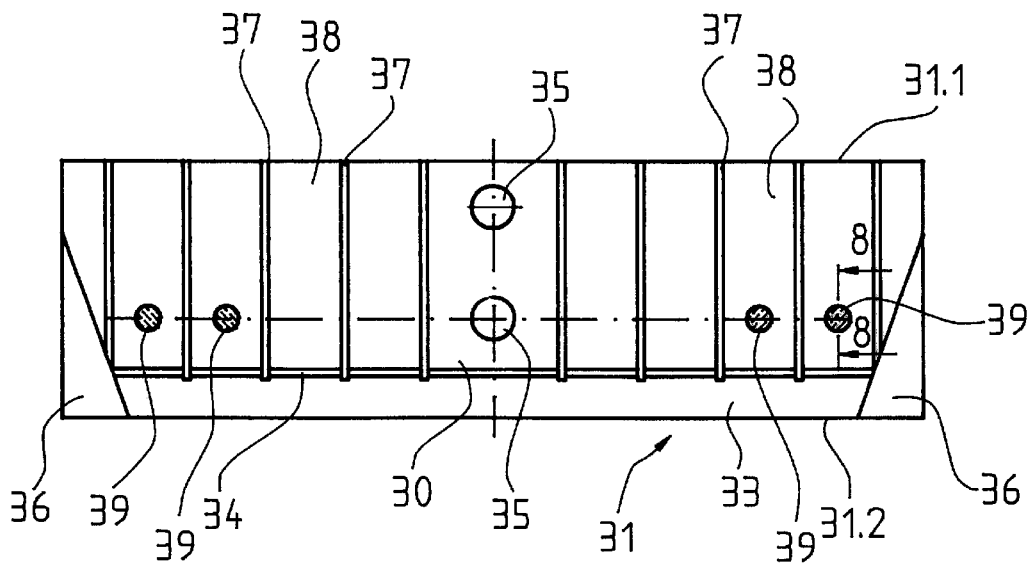
FIG. 7 is an elevation view showing the contact surface the shoe or liner of an alternate embodiment according to the present invention before being curved that incorporates high friction materials.

There is shown in the FIG. 7 and 8, a second or alternate embodiment of the brake lining 11 before being curved to cooperate with the mounting support 12 and the piston exterior surface 3. A brake lining 31 has the inwardly facing contact surface 30 extending across the width thereof. The contact surface 30 also extends from an upper edge 31.1 of the lining 31 to a recessed portion 33 extending the width of the lining and downwardly to a lower edge 31.2. The lower edge of the contact surface 30 and the upper edge of the recessed portion 33 are joined by an angled portion 34 extending generally horizontally at approximately forty-five degrees to the plane of the contact surface 30.

Provided at the center of the brake lining 31 is a pair of vertically aligned screw holes 35 to accept countersunk screws (not shown) that attach the brake lining to the support 12. Furthermore, the lower corners of the brake lining 31 can be ground off as shown by generally triangular-shaped corner portions 36 to provide clearance as the brake lining is pivoted past the exterior surface 3 of the piston 2. The brake lining 31 also has a plurality of spaced generally vertically extending grooves 37 formed in the contact surface 30 extending from the upper edge 31.1 to the recessed portion 33. Defined between the grooves 37 are planar sections 38.

The brake lining 31 is similar in construction and function to the brake lining 11, but has an additional feature. One or more increased friction spots 39 are provided in the contact surface 30 typically centered in the planar sections 38. The spots 39 can be located adjacent to the angled portion 34 and, although four spots are shown, more or less can be provided. Each of the spots 39 can be formed by drilling a plurality of apertures into the contact surface 10 at various angles to form a cavity. For example, in the FIG. 8, a first aperture 40 extends upwardly at approximately forty-five degrees to the horizontal, and a second aperture 41 extends downwardly at approximately forty-five degrees to the horizontal. Similar apertures can be drilled in different directions to enlarge the cavity. The apertures 40 and 41 can be approximately one-eighth inch deep. The resultant cavity has an opening in the contact surface 30 and can be filled with a relatively high coefficient of friction material 42 which material is exposed in the opening of the cavity. Such materials may contain grit or silica of various sizes in a slurry of suitable material known commercially as "Expando". Of course, as the contact surface 30 of the brake lining 31 wears, the friction material 42 will wear also to present a substantially even contact surface 30.

The brake lining 31 is especially useful with jack pistons having a highly polished exterior surface. Such a surface results in a relatively low breakaway friction making it harder to retain the brake arms 6 in the down and engaged position. The brake lining 31 increases the breakaway friction.

In summary, the braking apparatus 1 includes the pair of opposed brake arms 6 pivotally mounted at the respective pivot points 5 adjacent the piston 2 of the hydraulic elevator. The brake lining 11, 31 is attached to each of the brake arms 6 for engaging the exterior surface 3 of the piston 2. The brake lining has a plurality of the vertical grooves 17, 37 formed in the contact surface 10, 30 whereby as the brake linings are brought into engagement with the piston surface 3, the compression forces are evenly distributed by planar sections 18, 38 functioning as springs.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A brake lining for use in a brake apparatus for a hydraulic elevator for the locking of a generally cylindrical load carrying piston guided in a hydraulic cylinder, the brake lining comprising:

a generally planar brake lining body having an upper edge and a generally parallel lower edge, said brake lining body adapted to be bent to generally conform to a curvature of a piston exterior surface;

an inwardly facing contact surface formed on said brake lining body for frictional engagement with an exterior surface of a hydraulic elevator piston when said brake lining body is bent, said contact surface extending a width of said brake lining body and downwardly from said upper edge; and a plurality of spaced apart grooves formed in said contact surface extending from said upper edge toward said lower edge, said grooves permitting bending of said brake lining body at said grooves.

2. The brake lining according to claim 1 including an inwardly facing recessed portion formed on said brake lining body proximate said contact surface, a plane of said recessed portion being parallel to and offset from a plane of said contact surface, and an angled portion extending between said contact surface and said recessed portion providing a transition between said contact surface and said recessed portion.

3. The brake lining according to claim 2 wherein said contact surface, said recessed portion and said angled portion extend generally parallel between side edges of said brake lining body.

4. The brake lining according to claim 2 wherein said angled portion is formed at an angle of approximately forty-five degrees to said plane of said contact surface.

5. The brake lining according to claim 2 including a corner portion provided at each lower corner of said brake lining body, each said corner portion being formed by grinding said brake lining body selectively at said contact surface and said recessed portion.

6. The brake lining according to claim 5 wherein said corner portions are generally triangular in shape.

7. The brake lining according to claim 1 wherein said brake lining body is formed of CDA 110 copper material.

8. The brake lining according to claim 1 wherein said brake lining body is bent to conform said contact surface to the exterior surface of the piston, a generally vertically extending bend line being formed opposite each of said grooves on an outer surface of said lining.

9. An apparatus for braking a hydraulic elevator comprising:
- a brake arm having a support member with a curved inner surface;
- a brake lining body having an outer surface attached to said support member and having an upper edge and a generally parallel lower edge;
- an inwardly facing contact surface formed on said brake lining body for frictional engagement with an exterior surface of a hydraulic elevator piston, said contact surface extending a width of said brake lining body and downwardly from said upper edge; and
- a plurality of spaced apart grooves formed in said contact surface extending from said upper edge toward said lower edge, said brake lining body being bent along said grooves to form a bend line in said outer surface opposite each said groove and a plurality of generally planar sections extending between adjacent ones of said grooves, said brake lining body contacting said support member inner surface at said bend lines and said planar sections being spaced from said support member inner surface.

10. The brake lining according to claim 9 including an inwardly facing recessed portion formed on said brake lining body proximate said contact surface, a plane of said recessed portion being parallel to and offset from a plane of said contact surface, and an angled portion extending between said contact surface and said recessed portion providing a transition between said contact surface and said recessed portion.

11. A brake lining for use in a brake apparatus for a hydraulic elevator for the locking of a generally cylindrical load carrying piston guided in a hydraulic cylinder, the brake apparatus including a brake arm pivotally mounted at a pivot point adjacent the piston, the brake lining comprising:
- a generally planar brake lining body having an upper edge and a generally parallel lower edge, said brake lining body adapted to be bent to generally conform to a curvature of a piston exterior surface;
- an inwardly facing contact surface formed on said brake lining body for frictional engagement with an exterior surface of a hydraulic elevator piston when said brake lining body is bent, said contact surface extending a width of said brake lining body and downwardly from said upper edge;
- an inwardly facing recessed portion formed on said brake lining body proximate said contact surface, a plane of said recessed portion being parallel to and offset from a plane of said contact surface;
- an angled portion extending between said contact surface and said recessed portion providing a transition between said contact surface and said recessed portion; and
- a plurality of spaced apart grooves formed in said contact surface extending from said upper edge to said angled portion whereby when said brake lining body is bent to conform to a curvature of the piston exterior surface and attached to a curved mounting support, said brake lining body bends at said grooves to form generally planar sections extending between said grooves, said planar sections functioning as springs in response to compressive forces generated when said contact surface engages the piston exterior surface.

* * * * *